United States Patent [19]

Muroi et al.

[11] 4,197,129
[45] Apr. 8, 1980

[54] PLASTIC SUPPORT HAVING IMPROVED ADHESIVNESS TO MATERIAL TO BE BONDED THERETO

[75] Inventors: Yasuji Muroi; Hideyasu Ohta; Masaru Kanbe; Jun Shirasaki, all of Hino, Japan

[73] Assignee: Konishiroku Photo Industry Co., Ltd., Tokyo, Japan

[21] Appl. No.: 697,061

[22] Filed: Jun. 17, 1976

Related U.S. Application Data

[63] Continuation of Ser. No. 448,214, Mar. 5, 1974, abandoned.

[30] Foreign Application Priority Data

Mar. 5, 1973 [JP] Japan ................... 48-25216

[51] Int. Cl.² ............................................. G03C 1/80
[52] U.S. Cl. ...................... 430/625; 427/40; 427/223; 427/322; 427/324; 427/444; 427/412.1; 427/412.2; 427/54.1; 427/412.3; 427/412.5; 430/937
[58] Field of Search ............... 427/333, 322, 223, 54, 427/40, 39, 324, 385 B, 444, 407 E, 407 C, 407 R, 407 G, 407 D, 390, 40; 526/304; 96/87 R; 428/520, 522, 523

[56] References Cited

U.S. PATENT DOCUMENTS

| 2,718,515 | 9/1955 | Thomas | 526/304 |
|---|---|---|---|
| 2,795,820 | 6/1957 | Grow et al. | 427/223 |
| 2,844,731 | 7/1958 | Plonsky et al. | 427/44 |
| 3,361,587 | 1/1968 | Menikheim | 427/40 |
| 3,696,063 | 10/1972 | Mott et al. | 526/304 |
| 3,763,117 | 10/1973 | McKenna et al. | 428/522 |
| 3,814,617 | 6/1974 | Kasugai et al. | 427/333 |
| 3,833,403 | 9/1974 | Kogure | 427/333 |
| 3,930,099 | 12/1975 | Gregson | 427/407 E |
| 3,935,368 | 1/1976 | Weiss | 428/520 |
| 4,123,277 | 10/1978 | Ochiai | 96/87 R |

Primary Examiner—Ronald H. Smith
Assistant Examiner—Janyce A. Bell
Attorney, Agent, or Firm—Bierman & Bierman

[57] ABSTRACT

A hydrophobic plastic support which has a layer thereon comprising a copolymer, said copolymer consisting essentially of an acrylic monomer selected from alkyl esters of acrylic acid and alkyl esters of methacrylic acid, and an ethylenically unsaturated monomer having a group of the formula

—COXROH wherein X stands for an oxygen atom or

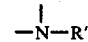

in which R' stands for a hydrogen atom, a substituted or unsubstituted alkyl group or a hydroxy group, and R stands for a substituted or unsubstituted alkylene group.

7 Claims, No Drawings

PLASTIC SUPPORT HAVING IMPROVED ADHESIVNESS TO MATERIAL TO BE BONDED THERETO

This application is a Rule 60 Continuation of copending U.S. Ser. No. 448,214 filed Mar. 5, 1974, now abandoned, the priority of which is hereby claimed, and which claims the priority of Japanese Application No. 25216 filed Mar. 5, 1973.

This invention relates to a plastic support having an improved adhesiveness to a material to be bonded to the plastic support (hereinafter referred to as "adherend").

Various adherends are bonded to plastic supports. This bonding includes various embodiments, for example, printing on plastic sheets, adhesion of recording layers on plastic supports (more specifically, electrostatically recording sheets and photosensitive materials for electrophotography), recording on laminate papers, laminate plastic sheets and plastic recording plates (more specifically, boards for aqueous ink), formation of photosensitive materials, and the like. Many attempts have heretofore been made to improve adhesiveness between plastic supports and adherends. However, it is very difficult to bond a hydrophilic adherend to a plastic support, because there is no compatibility between the hydrophobic support and the hydrophilic adherend. Nevertheless, attainment of bonding of a hydrophilic material to a hydrophobic plastic support has been greatly demanded because in the arts using hydrophilic materials use of certain kinds of hydrophobic plastic supports is indispensable owing to their excellent physical properties and the like. For example, in the field of photography, most of photosensitive layers are hydrophilic and polyester supports, more particularly polyethylene terephthalate supports, are typically used as plastic supports for these hydrophilic materials, but these plastic supports are highly hydrophobic, though they are excellent as supports for photosensitive materials for photography because they are excellent in physical properties (for example, strength, hardness and flexibility) and flatness of surface and they exhibit a high transparency in some cases. In order to bond a hydrophilic material to such plastic support having highly hydrophobic characteristics, there are adopted treatments for the surface of the hydrophobic plastic support, for example, surface-matting treatments (a mechanical matting treatment such as so-called sand blasting and a chemical matting treatment using a swelling agent for the support), saponification treatments, primer coating treatments forming a primer coating layer, for example, a primer coating layer having a multi-layer structure in which the compatibility to a hydrophilic material is gradually heightened in the layers, and the like. However, by the simple treatment a satisfactory adhesion between the hydrophobic plastic support and the hydrophilic material cannot be obtained, and if it is desired to improve the adhesion, since it is necessary to conduct a complicated treatment, it is impossible to conduct the bonding operation on an industrial scale. Further, in the case of photosensitive materials for photography and recording tapes or the like, such complicated treatments have bad influences on delicate characteristics of hydrophilic materials to be used, for example, sensitivity, fog, recording characteristics and physical characteristics such as loveliness, smoothness, flexibility, elongation and strength.

As specific examples of such pre-treated plastic supports, there are mentioned a polyester film having a layer of a vinylidene chloride terpolymer comprising an acid component, a plastic support having a layer of a mixture of gelatin and a polymer having a comatibility with the hydrophobic plastic support, a plastic support having a layer of a copolymer composed mainly of a poly vinyl monochloro acetate, and the like. However, only by formation of such layers on plastic supports, it is impossible to bond hydrophilic materials sufficiently. Therefore, in practical applications, in order to improve the adhesion it is necessary to incorporate in these layers a compound capable of swelling or dissolving the plastic support. Compounds to be used for this purpose, such as phenols and halogenated acetic acids, are generally poisonous to human bodies and give bad working environments when they are employed. Further, use of these compounds results in degradation of the levelness and smoothness of the support. Moreover, the adhesiveness of a plastic support treated with such compound tends to vary depending on the atmosphere. For example, the adhesiveness to a hydrophilic material is very low in the wet state, though it is fairly good in the dry condition. This tendency is not desired especially in the art of photography. More specifically, this causes peeling of a photographic gelatin layer formed on a plastic support, such as a silver halide photosensitive layer, a filter layer and a anti-halation layer, during photographic treatments such as development and fixation. Still further, as pointed above, a plastic support treated with such compound is defective in that it changes the characteristics of a hydrophilic material bonded thereto. For example, it has great influences on a photographic layer and damages a commercial value of the product.

It is a primary object of this invention to provide a plastic support having a high adhesiveness to an adherend.

Another object of this invention is to provide a plastic support having an especially high adhesiveness to a hydrophilic material, which can easily be prepared.

A further object of this invention is to provide a plastic support having properties especially suitable for formation of photographic materials, recording materials and the like.

More specifically, this invention relates to a plastic support having layer being composed of or containing a specific copolymer, said copolymer comprising as structural components the following two monomers:

(1) at least one acrylic monomer selected from alkyl esters of acrylic acid and alkyl esters of methacrylic acids, and (2) at least one ethylenically unsaturated monomer having a group represented by the following general formula

—COXROH wherein X is oxygen or

in which R' is a hydrogen atom or a substituted or unsubstituted alkyl group or hydroxyl group, and R stands for a substituted or unsubstituted alkylene group.

Namely, the copolymer to be used in this invention includes copolymers composed only of the acrylic monomer (1) and the ethylenically unsaturated monomer (2) and copolymers containing as structural components the acrylic monomer (1) and the ethylenically unsaturated monomer (2).

As typical instances of the acrylic monomer (1), there can be mentioned, for example, methyl acrylate, ethyl acrylate, propyl acrylate, butyl acrylate, methyl methacrylate, ethyl methacrylate, propyl methacrylate and butyl methacrylate. These monomers can be used singly or in combination of two or more of them. In view of the film-forming property and adhesiveness, it is preferred that the total amount of the monomer (1) contained in the copolymer is more than 50% by weight, especially more than 75% by weight.

In the general formula representing the residual group of the ethylenically unsaturated monomer (2), the alkyl group is such as methyl, ethyl, propyl and butyl groups which may be either straight-chain or branched alkyl groups. Thus, the alkyl group may be an isopropyl, iso-butyl, tert-butyl, tert-amyl group or the like.

Further, these alkyl groups may be substituted by other groups. For example, they can possess substituents such as halogens and hydroxyl and alkoxy groups.

The alkylene group in the above general formula includes substituted alkylene groups and unsubstituted alkylene groups. These alkylene groups correspond to residues formed by removing one hydrogen atom from the above-mentioned alkyl groups. Further, the alkylene group includes cyclic alkylene groups such as a cycloalkylene group, and these cyclic alkylene groups may have such substituents as mentioned above. As the ethylenically unsaturated monomer (2) having a side chain represented by the above general formula, there can be mentioned, for example, esters, amides, imides and the like of such acids as acrylic acid, methacrylic acid, itacomic acid and maleic acid. Specific examples include esters of such acids with aliphatic alcohols having at least two hydroxyl groups, such as hydroxymethyl acrylate, 2-hydroxyethyl acrylate, 2-hydroxypropyl acrylate, 3-hydroxypropyl acryalate, 4-hydroxybutyl acrylate, (2-hydroxy-1-methyl)ethyl acrylate, hydroxymethyl methacrylate, 2-hydroxyethyl methacrylate, 3-hydroxypropyl methacrylate, 4-hydroxybutyl methacrylate, (2-hydroxy-1-methyl)ethyl methacrylate, mono-(2-hydroxyethyl) itacontate, di-(2-hydroxyethyl) itaconate, mono-(2-hydroxyethyl) maleate and di-(2-hydroxyethyl) maleate, amide derivatives having a hydroxyl group at the end of the N-substituted group, such as N-(hydroxymethyl) acrylamide, N,N-di-(hydroxymethyl) acrylamide, N-(hydroxymethyl)-N-methyl acrylamide and N-(2-hydroxyethyl) acrylamide, and esters of the above-mentioned acids such as an acrylic acid ester of cyclohexane-1,4-diol and an acrylic acid ester of cyclohexane-1,4-dimethanol. In view of the adhesiveness or the like, it is preferred that the total amount of the ethylenically unsaturated monomer (2) contained in the copolymer is 0.5–25% by weight, especially 1–15% by weight.

Other monomer is sometimes used in combination with the acrylic monomer (1) and the ethylenically unsaturated monomer (2). This monomer is used for improving the film-forming property, increasing the stability of the copolymer, heightening the copolymerizability of the monomers, improving the pigment compatibility and the like without hindering attainment of the objects of this invention. Various monomers can be used as the comonomer. For example, it is possible to employ monomers having at least one double bond, such as styrene, acrylonitrile, α-methylstyrene, p-chlorostyrene, p-chloro-α-methylstyrene, acrylic acid, methacrylic acid, itaconic acid, maleic acid, acrylamide, vinyl acetate, methyl vinyl ether, butadiene and isoprene. These comonomers may be used singly or in combination of two or more of them. The total amount of the comonomer contained in the copolymer is 0–40% by weight, preferably 0–20% by weight.

These copolymers can be prepared by customary methods comprising dissolving monomers in an organic solvent and polymerizing them. Further, they can also be prepared by customary emulsion polymerization methods in which monomers dispersed in water are polymerized. In case polymerization is carried out with use of an organic solvent, any of solvents not inhibiting the polymerizations can be used. In case monomers are polymerized in the state dispersed in water, it is possible to employ surface active agents customarily used in this field, such as anionic surface active agents, for example, a metal salt of a sulfuric acid ester of an aliphatic alcohol, e.g., sodium lauryl sulfate, a metal salt of an aromatic sulfonic acid, e.g., sodium benzene-sulfonate, a derivative of such metal salt, and a non-ionic surface active agent including ethylene oxide.

Polymerization initiators customarily used in this field can be employed in this invention. For example, there can be employed peroxides such as hydrogen peroxide and benzoyl peroxide, persulfates such as potassium persulfate and ammonium persulfate, and azo compounds such as azobisisobutyronitrile.

Typical examples of syhtesis of the above-mentioned copolymers will now be described.

Synthesis Example 1

60 cc of deaerated and distilled water (referred to merely as "water" hereinafter and in subsequent Synthesis Examples) and 3.6 g of a surface active agent (2% aqueous solution of Newrex C-1 manufactured by Nippon Oils & Fats Co., LTD.) were mixed and, stirred, and the temperature of the mixture was raised to 50° C. in a nitrogen gas. Then, a solution of 0.6 g of ammonium persulfate in 3 cc of water was added to the mixture, and a solution of 0.06 g of sodium metabisulfite in 2 cc of water was further added. Then, a mixture of 57 g of ethyl acrylate and 3 g of 2-hydroxyethyl methacrylate was added slowly for one hour, while maintaining the temperature at 50° C. When two hours had passed from initiation of the dropwise addition, the reaction was stopped to obtain a milky white latex. A solid content of the latex was 49%.

Synthesis Example 2

73 cc of water, 9.5 g of ethyl acrylate, 0.5 g of 2-hydroxyethyl acrylate and 0.1 g of sodium lauryl sulfate (Sintlex L-100 manufactured by Nippon Yushi) were mixed together and stirred, and when a mixture of 3 cc of water and 0.6 g of ammonium persulfate was added to the mixture and the temperature was raised to 60° C., reaction was initiated. A emulsified mixture of 27 cc of water, 85.5 g of ethyl acrylate, 4.5 g of 2-hydroxyethyl acrylate and 0.9 g of sodium lauryl sulfate (same as above) was gradually added dropwise for 1 hour, maintaining the temperature between 60° C. and 70° C. Then the reaction was continued for 1 hour while maintaining the temperature not exceeding 80° C. A solid content of the latex was 48%.

Synthesis Example 3

When emulsion polymerization was conducted in the same manner as in Synthesis Example 1 except that the weight ratio of ethyl acrylate and 2-hydroxyethyl methacrylate was changed to 99:1, a milky white latex was obtained. A solid content of the latex was 48%.

Synthesis Example 4

When emulsion polymerization was conducted in the same manner as in Synthesis Example 1 except that the weight ratio of ethyl acrylate and 2-hydroxyethyl methacrylate was changed to 9:1, a milky white latex was obtained. A solid content of the latex was 49%.

Synthesis Example 5

Emulsion polymerization was conducted in the same manner as in Synthesis Example 1 except that the weight ratio of ethyl acrylate and 2-hydroxyethyl methacrylate was changed to 75:25. A milky white latex was obtained. A solid content of the latex was 46%.

Synthesis Example 6

When emulsion polymerization was carried out in the same manner as in Synthesis Example 2 except that the weight ratio of ethyl acrylate and 2-hydroxyethyl acrylate was changed 9:1, a milky white latex was obtained. A solid content of the latex was 48%.

Copolymers of this invention can be prepared according to methods described in the foregoing Synthesis Examples. Copolymers other than those mentioned above can be synthesized according to these Synthesis Examples. More specifically, various copolymers can be prepared by substituting components used in Synthesis Examples by other acrylic monomer (1) and ethylenically unsaturated monomer (2) and optionally adding other comonomers having an unsaturated double bond. Further, it is possible to obtain various copolymers by changing the ratio of the monomers to be copolymerized.

In this invention, the so prepared copolymer is applied to a plastic support. In general, a layer of the copolymer is formed on a plastic support by applying a coating composition comprising the copolymer on a plastic support by a suitable coating method, for example, a dip coating method, a roll coating method, a double-roll coating method, a spray coating method, a curtain coating method, a flow coating method, a bead coating method or the like, and drying the coated support.

The coating composition to be used varies depending on the kind of the polymerization procedure, the kind of the plastic support, the kind of the adherend and other factors. For example, a copolymer liquid obtained according to the solution polymerization can be used directly or after dilution with a suitable solvent in some coating methods. Further, the copolymer liquid may be incorporated with additives to form a coating composition. It is also possible to prepare a coating composition by incorporating a copolymer liquid obtained by the solution polymerization with a nonsolvent for the copolymer to precipitate the copolymer, recovering the copolymer by filtration, drying the separated copolymer to form a solid and dissolving the solid into a suitable solvent at the time of application.

A copolymer liquid obtained by the emulsion polymerization can be used as a coating composition directly or after dilution with a suitable solvent. It is also possible to prepare a coating composition by drying the copolymer liquid and dissolving or dispersing the dried product in a suitable solvent or dispersion medium.

As pointed above, the so formed coating composition may comprise various additives according to need. More specifically, in addition to the copolymer, the solvent or dispersion medium, an anionic or non-ionic surface active agent such as mentioned above or a cationic surface active agent and the like, the coating composition may comprise, for example, a matting agent such as silica particles and polymer mat particles, a halation-preventive or coloring dye or pigment, an antistatic compound, a binder such as gelatin, a suitable film-hardening agent such as an aldehyde compound, e.g., formaldehyde and glyoxal mucochloric acid, a compound having an ethylene-imino group e.g., tetramethylene-1,4-bis(ethyleneurea), and hexamethylene-1,6-bis(ethyleneurea), a methane-sulfonic acid ester, e.g., a trimethylene-bis-methanesulfonic acid ester, an active vinyl compound, e.g., bis-acryloylurea and m-xylene divinyl sulfone, an active halogen-containing compound, e.g., 2-methoxy-4,6-dichloro-triazine, an epoxy group-containing compound, e.g., bisphenol glycidyl ether and an isocyamate compound, other polymer or copolymer or a dispersion thereof, and the like. The coating composition is generally applied on one or both surfaces of the plastic support so that the coated amount of the polymer solid is preferably about 0.05–5 g/m$^2$.

A suitable pre-treatment can be performed on one or both surfaces of the plastic support before the coating composition is coated thereon. For example, if the plastic support is subjected to the so called corona discharge treatment and then the coating composition is applied thereon, it is possible to further improve the adhesion between the adherend and the plastic support. In some plastic supports, better results can be obtained by such pre-treatments as the corona discharge treatment ultraviolet ray radiation treatment and flame treatment.

The corona discharge treatment is performed with use of an apparatus in which electrons are accelerated and discharged between a pair of electrodes, and a similar treatment giving electric shocks can also be effectively employed. The ultraviolet ray radiation treatment is generally performed by employing a mercury lamp. Although low pressure mercury lamps, medium pressure mercury lamps and high pressure mercury lamps can be used for this purpose, a better adhesion is obtained by conducting radiation with use of a low pressure mercury lamp. The flame treatment is conducted with use of an oxidizing flame, and any of devices generating an oxidizing flame can be used.

In the case of certain plastic supports, it is permissible that prior to the stretching step during the manufacturing process or prior to the final stretching step when the biaxial stretching is conducted, the coating composition is applied on the support, and then the above stretching treatment is performed.

The plastic support to be used in this invention should have hydrophobic characteristics. Typical instances are polyolefin supports, polystyrene supports, polyamide supports, polyester supports represented by polyethylene terephthalate supports, polycarbonate supports and supports of cellulose derivatives such as cellulose triacetate. Use of a support having an especially high hydrophobic property, such as a polyester support or the like, is effective. These supports can take either a film-like or sheet-like form.

In view of the film-forming property, the adhesion and the like, it is generally preferred that the copolymer applied to such support has a molecular weight ranging from about 3000 to about 150000, especially larger than about 5000. Further, in view of prevention of occurrence of so called blocking caused on lapping or winding of copolymer-coated supports during the preparation process and also in view of attainment of a high adhesion, it is desired that the copolymer has a glass transition temperature ranging from about $-30°$ to about $+30°$ C.

A layer composed of the copolymer or a layer containing the copolymer (these two layers will be inclusively referred to as "copolymer layer" hereinafter) is thus formed on at least one surface of the plastic support. The so prepared plastic support having a copolymer layer has an excellent adhesiveness to an adherend and this adhesiveness is especially improved to hydrophilic adherends. Further, since a poisonous compound need not be employed in preparing the plastic support of this invention, there is no danger of contamination of the working environment. Moreover, the plastic support of this invention is advantageous in that the adhesiveness is not influenced by the atmosphere. In other words, the adhesiveness is not changed whether in the dry state or in the wet state. Moreover, the plastic support of this invention has no bad influence on the adherend.

Accordingly, when the plastic support of this invention is utilized in the art of photography, a photographic gelatin layer formed on the copolymer layer of the support, such as a silver halide layer, a filter layer, an intermediate layer or an image-receiving layer, can be bonded very tightly, and this photographic gelatin layer is not peeled off at a photographic treatment such as development. The plastic support of this invention is also advantageous in that it does not have bad influences on photographic characteristics of the photographic gelatin layer (such as degradation of sensitivity and increase of fog) nor bad influences on physical properties, e.g., degradation of levelness (bad influences on physical properties result in degradation of photographic characteristics). Even when adherends other than the photographic gelatin layer, such as a diazotype photosensitive composition, a photosensitive resin composition, a magenetic material and the like are coated on the copolymer layer of the plastic support of this invention, these adherends can be bonded tightly without degradation of properties thereof.

The reason why the plastic support of this invention has such excellent properties as mentioned above has not completely been elucidated, but it is construed that the copolymer constituting, or contained in, the copolymer layer of the plastic support of this invention has soft segments of an alkyl ester of acrylic or methacrylic acid and hydrophilic or reactive segments having the group —COXROH (in which X and R are as defined above) at the side chain and these segments give well-balanced physical and chemical properties to the surface of the copolymer layer. More specifically, the adhesion or adhesive force between two substances is highest when a chemical bonding is formed therebetween, and it is considered that as other factor giving such adhesion or adhesive force, the surface free energy enlarging the softness or coating force which in turn enlarges the deformation energy on peeling is of great significance.

In this connection, it is believed that the copolymer to be used in this invention gives the surface of the copolymer layer a suitable softness and a high surface energy owing to the hydrophilic group. It is also construed that the —COXROH segments having a possibility to form ester linkages or cause dehydrating condensation with reactive groups in the copolymer and the adherend may probably aid in improving the adhesion or adhesive force.

This invention will now be illustrated more detailedly by reference to Examples, which by no means limit the scope of this invention.

EXAMPLE 1

A biaxially stretched polyethylene terephthalate film having a thickness of 180μ was subjected to the corona discharge treatment mentioned below. The contact angle to water of the treated surface of the so treated film was about 52° as measured at room temperature. Separately, a dispersion containing a copolymer indicated in Table 1 was diluted with water so that the copolymer solid content was 2.5% by weight, and a matting agent of the silica type was added to the dilution in an amount of 0.1% by weight based on the copolymer solid. The so formed coating composition was coated on the corona discharge-treated surface of the film in a liquid film thickness of 27μ by a method using a fountain coater and an air doctor knife, and then dried to obtain a film support of this invention.

Corona Discharge Treatment

One or both surfaces of the film were treated with use of a corona discharge device (4 KW) manufactured by Kasuga Denki under the following conditions, namely a film speed of 10 m/min, an electrode distance of 0.8 mm and a plate voltage of 2.5 KV.

The order to examine the adhesiveness to a hydrophilic material of the so prepared, copolymer layer-formed film of this invention, a conventional silver halide photographic emulsion for X-ray photography containing silver iodobromide was coated on the copolymer layer according to a customary method and dried to obtain a sample.

For comparison, with use of a copolymer dispersion obtained in Comparative Synthesis Example 1 given below, a comparative copolymer layer was formed on a polyethylene terephthalate film under the same conditions as above. A photographic emulsion was coated on the so prepared comparative film and dried in the same manner as described above, to obtain a comparative sample 1.

Comparative Synthesis Example 1

20 g of vinylidene chloride, 5 g of methyl acrylate and 1.2 g of itaconic acid were added to a solution of 0.2 g of sodium lauryl sulfate in 100 cc of deaerated and distilled water. The inside atmosphere of a reaction vessel was substituted by a nitrogen gas, and the inside temperature was raised to 35° C. Then, a solution of 0.4 g of potassium persulfate in 10 cc of deaerated and distilled water was added to the mixture, and a solution of 0.4 g of sodium metabisulfite in 10 cc of deaerated and distilled water was further added thereto.

The mixture was reacted for 7 hours while maintaining the reaction temperature at 35° C. to effect polymerization. As a result, a milky white latex was obtained. A solid content of the latex was 15%.

Each of the so prepared samples was subjected to the following tests, the test for determining the adhesion between the emulsion layer and film in the dry state (dry adhesion test) and the test for determining the adhesion between the emulsion layer and film in the state dipped in a treating liquid (dip adhesion test).

Dry Adhesion Test

Square scars reaching the film support were formed on the emulsion layer face of the sample by means of a razor, and a cellophane adhesive tape was applied thereon under compression. Then, the tape was abruptly peeled off, and the ratio (%) of the area in which the emulsion layer was left in the state adhering to the support to the total area to which the cellophane tape was applied was calculated. Accordingly, when the obtained value was 100%, it indicates that the emulsion layer was not at all peeled and a very tight adhesion was attained between the emulsion layer and the support. In contrast, if the value was 0%, it indicates that all the emulsion layer was peeled in the area to which the cellophane tape was applied under compression. In short, as this value is higher, a better adhesion is attained between the adherend and the support. From the practical viewpoint, no trouble is brought about when this value is at least 80%.

Dip Adhesion Test

The sample was dipped in a treating liquid, and square scars were formed on the emulsion layer of the sample in the treating liquid by a drill-like sharp edge and the scared face was rubbed with fingers. The ratio (%) of the area in which the emulsion layer was left in the state adhering to the support to the total area rubbed with fingers was calculated. Accordingly, as the obtained value is higher, a better adhesion is attained between the emulsion layer and the support. From the practical viewpoint, no trouble is brought about if the value is at least 80%.

In this Example 1, a customary liquid developer for X-ray photography was used as the treating liquid in the dip adhesion test.

Results of these tests are shown in Table 1.

Table 1

| Sample No. | Copolymer Dispersion Used | Dry Adhesion Test | Dip Adhesion Test |
|---|---|---|---|
| 1 | dispersion obtained in Synthesis Example 2 | 100% | 100% |
| 2 | dispersion obtained in Synthesis Example 3 | 80% | 100% |
| 3 | dispersion obtained in Synthesis Example 4 | 100% | 100% |
| 4 | dispersion obtained in Synthesis Example 5 | 80% | 100% |
| 5 | dispersion obtained in Synthesis Example 6 | 100% | 100% |
| 6 | dispersion obtained in Comparative Synthesis Example 1 | 20% | 50% |

As is apparent from the results shown in Table 1, the plastic supports of this invention had an excellent adhesiveness to the adherend either in the dry state or wet state. Further, as a result of the development test, it was confirmed that the plastic supports of this invention did no harm to the photographic characteristics of the emulsion layer. Namely, they did not cause any of such undesired phenomena as reduction of the gamma value and formation of fog. Thus it was found that the plastic supports of this invention were excellent as photographic supports.

EXAMPLE 2

A biaxially stretched polyethylene terephthalate film having a thickness of 100μ was subjected to the corona discharge treatment in the same manner as described in Example 1. The contact angle to water of the treated surface was about 50° as measured at room temperature. The copolymer dispersion obtained in Synthesis Example 1 was diluted with water so that the solid content was 3% by weight and tetramethylenebisurea was added to the dilution in an amount of 3% by weight based on the solid. The so prepared coating composition was coated on the treated surface of the film according to a customary double-roll coating method, and was then dried. The coating was so conducted that the coated liquid film thickness was about 20μ. Thus was obtained a plastic support of this invention. For comparison, the above procedures were repeated in the same manner except that a copolymer dispersion obtained in Comparative Synthesis Example 2 given below was used instead of the copolymer dispersion obtained in Synthesis Example 1, whereby a comparative support was obtained.

Comparative Synthesis Example 2

48.6 g of ethyl acrylate was added to a solution of 10 g of 30% by weight Tracks K-40 (surface active agent manufactured by Nippon Oils & Fats Co., Ltd.) in 293 cc of deaerated and distilled water, and the mixture was substrated for 15 minutes with a nitrogen gas, following which 0.6 g of potassium persulfate was added thereto and stirred. Then, the inside temperature was raised to 50° C. to initiate polymerization, and the polymerization reaction was continued for 3 hours at an inside temperature maintained at 80° C., to obtain a milky white latex. A solid content of the latex was 13%.

The adhesiveness to a hydrophilic material was tested with respect to each of the so obtained supports in the following manner. An aqueous solution of gelatin containing 0.5 g of gelatin and 0.02% by weight of saponin was coated on the copolymer layer of the support in a liquid film thickness of 15μ according to a customary method and was then dried. A lith-type photosensitive emulsion containing silver chlorobromide was coated and dried on the gelatin layer. Thus were prepared samples 7 and 8, the sample 7 including the support of this invention and the sample 8 including the comparative support.

Each of the so obtained samples was subjected to the dry adhesion test and the dip adhesion test (a customary lith-type liquid developer was used as a treating liquid) in the same manner as described in Example 1, to obtain results shown in Table 2.

Table 2

| Sample No. | Copolymer Dispersion Used | Dry Adhesion Test | Dip Adhesion Test |
|---|---|---|---|
| 7 | dispersion obtained in Synthesis Example 1 | 100 % | 100 % |
| 8 | dispersion obtained in Comparative Synthesis Example 2 | 0 % | 20 % |

As is apparent from the results shown in Table 2, the sample 7 of this invention had an excellent adhesiveness between the plastic support and the adherend and this excellent adhesiveness was attained either in the dry state or at the treatment. Further, as a result of the development test, it was confirmed that no bad influences were given to photographic characteristics in the case of the sample 7 of this invention.

EXAMPLE 3

A biaxially stretched polyethylene terephthalate film having a thickness of 100μ was exposed for 20 minutes under radiation of a low pressure mercury lamp (40 W) having a main wavelength of 2537 A which was disposed 5 cm apart from the film. The radiation atmosphere was maintained at a temperature of 25° C. and a relative humidity of 65%. A copolymer dispersion shown in Table 3, which was diluted with water-methanol (volume ratio being 9:1) so that the copolymer solid content was 2.5% by weight, was coated on the treated surface of the film which had been subjected to the above ultraviolet radiation treatment, according to a customary double-roll coating method and was then dried. Thus were prepared films having a copolymer layer.

The adhesiveness to an adherend was tested with respect to each of the so obtained, 0.03 g of saponin and 0.3 g of mucochloric acid in methanol-water (volume ratio being 70:30) was coated on the copolymer layer of the sample in a liquid film thickness of 15μ according to a customary method and was then dried. Further, according to a customary method, a lith-type anti-halation coating liquid comprising a halation-preventive dye and gelatin was coated and dried on the gelatin layer.

The so obtained samples having adherend layers formed on the copolymer layer were subjected to the same dry adhesion test and dip adhesion test as described in Example 1. A conventional lith-type liquid developer was employed as a treating liquid in the dip adhesion test. Results are shown in Table 3.

Table 3

| Sample No. | Copolymer Dispersion Used | Dry Adhesion Test | Dip adhesion Test |
|---|---|---|---|
| 9 | dispersion obtained in Synthesis Example 2 | 100 % | 100 % |
| 10 | dispersion obtained in Synthesis Example 4 | 95 % | 100 % |
| 11 | dispersion obtained in Synthesis Example 6 | 100 % | 100 % |
| 12 | dispersion obtained in Comparative Synthesis Example 3 | 0 % | 20 % |

In Table 4, the sample 12 was one prepared by employing a comparative copolymer dispersion obtained in Comparative Synthesis Example 3 given below.

Comparative Synthesis Example 3

60 cc of deaerated and distilled water and 3.6 g of a surface active agent (2% aqueous solution of Newrex C-1 manufactured by Nippon Oils & Fats Co., LTD.) were mixed and stirred. A nitrogen gas was blown into a reaction vessel to substitute air in the reaction vessel by nitrogen and the temperature was elevated to 50° C. Then, a solution of 0.6 g of ammonium persulfate in 3 cc of deaerated and distilled water was added to the mixture, and a solution of 0.06 g of sodium metabisulfite in 2 cc of deaerated and distilled water was further added thereto. A mixture of 33 g of ethyl acrylate, 24 g of styrene and 3 g of 2-hydroxyethyl acrylate was added slowly for 1 hour, while maintaining the temperature at 50° C. After 2 hours had passed from initiation of the dropwise addition, a milky white emulsion was obtained. A solid content of the latex was 46%.

As is apparent from the results shown in Table 3, samples 9 to 11 of this invention had an excellent adhesiveness to the adherend.

What is claimed is:

1. A hydrophobic plastic support which has a layer thereon comprising a copolymer, and a photographic gelatin layer on said layer, said copolymer comprising
   (1) more than 50% by weight of an acrylic monomer selected from alkyl esters of acrylic acid and alkyl esters of methacrylic acid, and
   (2) 0.5 to 25% by weight of an ethylenically unsaturated monomer having a group of the formula —COXROH 

wherein X represents an oxygen atom or

in which R' represents a hydrogen atom, a substituted or unsubstituted alkyl group or a hydroxy group, and R represents a substituted or unsubstituted alkylene group.

2. The hydrophobic plastic support according to claim 1 wherein said copolymer further comprises 0 to 40% by weight of another monomer selected from the group consisting of styrene, acrylonitrile, α-methylstyrene, p-chlorostyrene, p-chloro-α-methylstyrene, acrylic acid, methacrylic acid, itaconic acid, maleic acid, acrylamide, vinyl acetate, methyl vinyl ether, butadiene and isoprene.

3. The hydrophobic plastic support according to claim 1 wherein said acrylic monomer is selected from the group consisting of methyl acrylate, ethyl acrylate, propyl acrylate, butyl acrylate, methyl methacrylate, ethyl methacrylate, propyl methacrylate and butyl methacrylate.

4. The hydrophobic plastic support according to claim 1 wherein said copolymer has a molecular weight of from 3000 to 150000.

5. The hydrophobic plastic support according to claim 1 wherein said support is selected from the group consisting of polyolefin, polystyrene, polyamide, polyester, polycarbonate and cellulose derivatives.

6. A method for adhering a photographic gelatin layer to a hydrophobic plastic support comprising applying to the support a layer comprising the copolymer of claim 1 and applying thereafter the photographic gelatin layer to the layer of the copolymer.

7. The method according to claim 1 further comprising pretreating the support by the method selected from a group consisting of corona discharge, ultraviolet radiation or flame treatment prior to the step of applying the layer comprising the copolymer to the support.

* * * * *